United States Patent
Ling et al.

(10) Patent No.: US 11,985,516 B2
(45) Date of Patent: May 14, 2024

(54) METHOD AND APPARATUS FOR TRP DOWNLINK TRANSMISSION

(71) Applicant: LENOVO (BEIJING) LIMITED, Beijing (CN)

(72) Inventors: Wei Ling, Beijing (CN); Chenxi Zhu, Beijing (CN); Bingchao Liu, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 401 days.

(21) Appl. No.: 17/280,052

(22) PCT Filed: Nov. 23, 2018

(86) PCT No.: PCT/CN2018/117262
§ 371 (c)(1),
(2) Date: Mar. 25, 2021

(87) PCT Pub. No.: WO2020/103148
PCT Pub. Date: May 28, 2020

(65) Prior Publication Data
US 2022/0038918 A1 Feb. 3, 2022

(51) Int. Cl.
*H04W 16/28* (2009.01)
*H04W 72/044* (2023.01)
(Continued)

(52) U.S. Cl.
CPC ....... *H04W 16/28* (2013.01); *H04W 72/0446* (2013.01); *H04W 72/046* (2013.01); *H04W 72/23* (2023.01); *H04W 80/02* (2013.01)

(58) Field of Classification Search
CPC ............. H04W 16/28; H04W 72/0446; H04W 72/046; H04W 72/23; H04W 80/02; H04B 7/024; H04B 7/0617
See application file for complete search history.

(56) References Cited

U.S. PATENT DOCUMENTS 10,693,610 B2 * 6/2020 Liu ................. H04L 5/001
2020/0153552 A1 * 5/2020 Zhang ............... H04W 72/53

FOREIGN PATENT DOCUMENTS

| CN | 108282198 A | 7/2018 |
| CN | 108811074 A | 11/2018 |
| WO | 2013041138 A1 | 3/2013 |

OTHER PUBLICATIONS

Ericsson, Remaining details of beam management, 3GPP TSG-RAN WG1 #91, R1-1721366, Nov. 27-Dec. 1, 2017, pp. 1-16, Reno, USA.

(Continued)

*Primary Examiner* — Kibrom T Hailu
(74) *Attorney, Agent, or Firm* — Kunzler Bean & Adamson (57) ABSTRACT

Embodiments of the present disclosure are directed to a method and apparatus for TRP downlink transmission. In an embodiment of the present disclosure, the apparatus includes at least one transmitter that transmits a spatial information configuration for downlink transmission. The spatial information configuration configures at least one time unit for at least one of predefined spatial information and un-predefined spatial information. In the case that the time unit is configured for the predefined spatial information, the downlink transmission is transmitted according to the predefined spatial information. In the case that the time unit is configured for un-predefined spatial information, the downlink transmission is transmitted according to the spatial information indicated in the specific spatial information in the downlink control channel or configured by the high layer signaling.

16 Claims, 9 Drawing Sheets

(51) Int. Cl.
*H04W 72/0446* (2023.01)
*H04W 72/23* (2023.01)
*H04W 80/02* (2009.01)

(56) References Cited

OTHER PUBLICATIONS

Catt, Remaining details on beam management, 3GPP TSG RAN WG1 Meeting 91, R1-1720182, Nov. 27-Dec. 1, 2017, pp. 1-11, Reno, USA.
Mediatek, Further Details on Beam Management, Ha,3GPP TSG RAN WG1 Meeting #91, R1-1719565, Nov. 27-Dec. 1, 2017, pp. 1-7, Reno, USA.
International Searching Authority, "Notification of Transmittal of the International Search Report and the Written Opinion of the International Searching Authority, or the Declaration", PCT/CN2018/117262, dated Nov. 23, 2018, pp. 1-9.

* cited by examiner

METHOD AND APPARATUS FOR TRP DOWNLINK TRANSMISSION

TECHNICAL FIELD

Embodiments of the present disclosure generally relate to wireless communication technology, especially to a method and apparatus for TRP (Transmit-Receive Point) downlink transmission.

BACKGROUND

Enhancements on MIMO (Multiple-Input Multiple-Output) for NR have been discussed in RP-181453. The work item aims to specify the enhancements identified for NR MIMO. One of the objectives is to extend specification support in the following areas [RAN1], including: enhancements on MU-MIMO support; enhancements on multi-TRP/panel transmission including improved reliability and robustness with both ideal and non-ideal backhaul; enhancements on multi-beam operation; performing study and making conclusion in the first RAN1 meeting after start of the WI, and if needed, specifying CSI-RS (Channel State Information-Reference Signal) and DMRS (Demodulation Reference Signal) (both downlink and uplink) enhancement for PAPR (Peak to Average Power Ratio) reduction for one or multiple layers; and specifying enhancement to allow full power transmission in case of uplink transmission with multiple power amplifiers (assume no change on UE power class).

Specifically, the enhancements on multi-TRP and/or panel transmission include improved reliability and robustness with both ideal and non-ideal backhaul, and include specifying downlink control signaling enhancement(s) for efficient support of non-coherent joint transmission; and performing study and, if needed, specifying enhancements on uplink control signaling and/or reference signal(s) for non-coherent joint transmission.

SUMMARY OF THE APPLICATION

An embodiment of the present disclosure provides an apparatus. The apparatus may include at least one transmitter that: transmits a spatial information configuration for downlink transmission, wherein the spatial information configuration configures at least one time unit for at least one of predefined spatial information and un-predefined spatial information, and the un-predefined spatial information is to be indicated in specific spatial information in a downlink control channel or configured by a high layer signaling; and transmits a downlink transmission in a time unit based on the spatial information configuration, wherein, in the case that the time unit is configured for the predefined spatial information, the downlink transmission is transmitted according to the predefined spatial information; and in the case that the time unit is configured for un-predefined spatial information, the downlink transmission is transmitted according to the spatial information indicated in the specific spatial information in the downlink control channel or configured by the high layer signaling.

Another embodiment of the present disclosure provides an apparatus. The apparatus may include at least one receiver that: receives a spatial information configuration for downlink transmission, wherein the spatial information configuration configures at least one time unit for at least one of predefined spatial information and un-predefined spatial information, and the un-predefined spatial information is to be indicated in specific spatial information in a downlink control channel or configured by a high layer signaling; receives a downlink transmission according to the predefined spatial information in a time unit in the case that the time unit is configured for the predefined spatial information according to the spatial information configuration; and receives a downlink transmission according to the spatial information indicated in the specific spatial information in the downlink control channel or configured by the high layer signaling in a time unit in the case that the time unit is configured for un-predefined spatial information according to the spatial information configuration.

In an embodiment of the present disclosure, an apparatus may include at least one transmitter that: transmits a time allocation configuration for downlink transmission, wherein the time allocation configuration configures a subset of time units for each of a plurality of transmit-receive points; and transmits a downlink transmission in a time unit based on the time allocation configuration.

In another embodiment of the present disclosure, an apparatus may include at least one receiver that: receives a time allocation configuration for downlink transmission, wherein the time allocation configuration configures a subset of time units for each of a plurality of transmit-receive points to do downlink transmission; receives spatial information for downlink transmission; and receives a downlink transmission in a time unit according to spatial information indicated by the transmit-receive point.

An embodiment of the present disclosure provides a method. The method may include: transmitting a spatial information configuration for downlink transmission, wherein the spatial information configuration configures at least one time unit for at least one of predefined spatial information and un-predefined spatial information, and the un-predefined spatial information is to be indicated in specific spatial information in a downlink control channel or configured by a high layer signaling; and transmitting a downlink transmission in a time unit based on the spatial information configuration, wherein, in the case that the time unit is configured for the predefined spatial information, the downlink transmission is transmitted according to the predefined spatial information; and in the case that the time unit is configured for un-predefined spatial information, the downlink transmission is transmitted according to the spatial information indicated in the specific spatial information in the downlink control channel or configured by the high layer signaling.

Another embodiment of the present disclosure provides a method. The method may include: receiving a spatial information configuration for downlink transmission, wherein the spatial information configuration configures at least one time unit for at least one of predefined spatial information and un-predefined spatial information, and the un-predefined spatial information is to be indicated in specific spatial information in a downlink control channel or configured by a high layer signaling; receiving a downlink transmission according to predefined spatial information in a time unit in the case that the time unit is configured for the predefined spatial information according to the spatial information configuration; and receiving a downlink transmission according to the spatial information indicated in the specific spatial information in the downlink control channel or configured by the high layer signaling in a time unit in the case that the time unit is configured for un-predefined spatial information according to the spatial information configuration.

In an embodiment of the present disclosure, a method may include: transmitting a time allocation configuration for downlink transmission, wherein the time allocation configuration configures a subset of time units for each of a plurality of transmit-receive points; and transmitting a downlink transmission in a time unit based on the time allocation configuration.

In another embodiment of the present disclosure, a method may include: receiving a time allocation configuration for downlink transmission, wherein the time allocation configuration configures a subset of time units for each of a plurality of transmit-receive points to do downlink transmission; receiving spatial information for downlink transmission; and receiving a downlink transmission in a time unit according to spatial information indicated by the transmit-receive point.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings.

In a wireless communication system, there may be at least one TRP. A TRP acts like a small base station, while has backhaul. Thus, different TRPs may have large latency. The TRP can be used to serve one or more UEs (User Equipment) under the control of a base station. In different scenario, the TRP may be called in different terms. In fact, in some scenarios, for example, in a scenario of CoMP (Coordinated Multi-Point), the TRP can even be a base station. Persons skilled in the art should understand that as the 3GPP (3rd Generation Partnership Project) and the communication technology develop, the terminologies recited in the specification may change, which should not affect the scope of the present disclosure.

Figure 1:
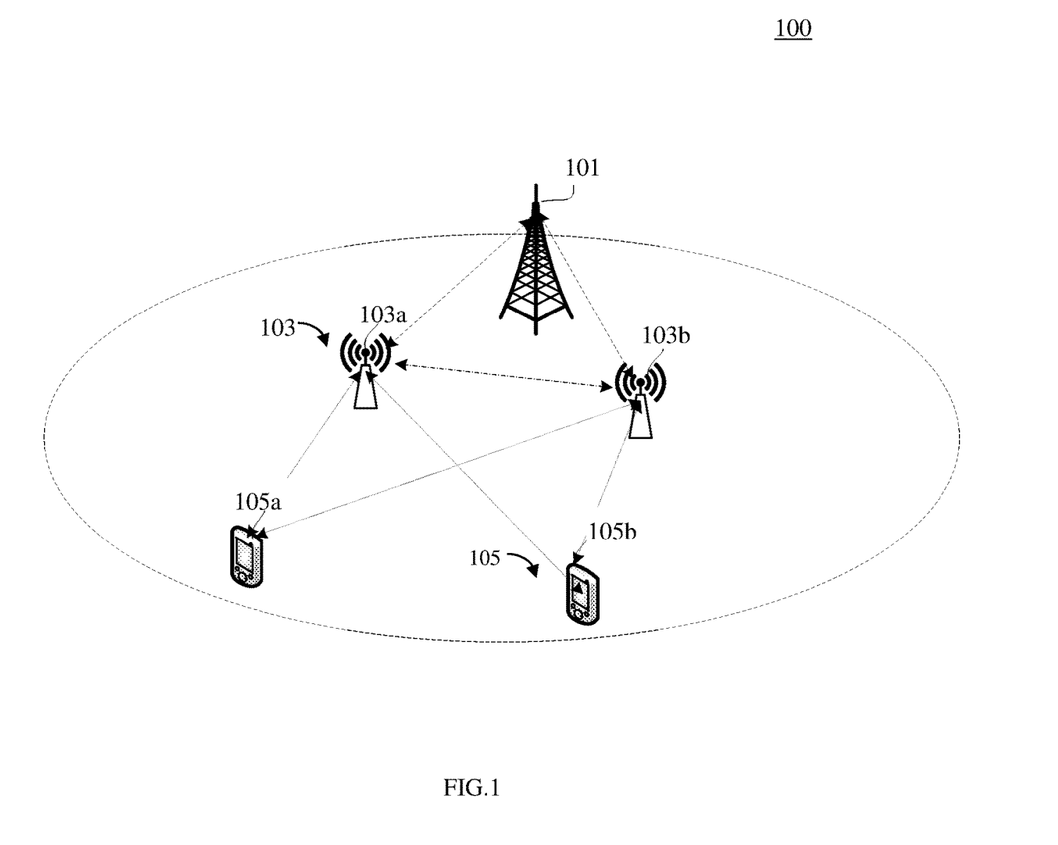
FIG. 1 is a schematic diagram illustrating an exemplary wireless communication system including at least one TRP in accordance with an embodiment of the present disclosure.

FIG. 1 is a schematic diagram illustrating an exemplary wireless communication system 100 including at least one TRP 103 in accordance with an embodiment of the present disclosure.

Specifically, as shown in FIG. 1, there are one base station 101, two TRPs 103, i.e., a first TRP 103a, and a second TRP 103b; and two UEs 105, i.e., a first UE 105a and a second UE 105b in the exemplary wireless communication system 100. Although only one base station 101, two TRPs 103 and two UEs 105 are shown for simplicity, it should be noted that the wireless communication system 100 may further include more base stations 101, TRPs 103, and UEs 105. The base station 101 may be a gNB in some scenarios. The TRPs 103, for example, the first TRP 103a and the second TRP 103b may connect the same or different base stations 101, for example by backhaul. Each TRP 103 may serve a number of remote units, for example UEs 105. As an example, each of the first TRP 103a and the second TRP 103b may serve a number of mobile stations including the first UE 105a and the second UE 105b within a serving area, for example, a cell or a cell sector. The first TRP 103a and the second TRP 103b can communicate with each other, for example by backhaul. The first UE 105a and the second UE 105b may be a computing device, a wearable device, or a mobile device, etc.

The UEs 105 may use different receiving beams (RX beams) to receive downlink transmission from the different TRPs 103. Beams can be expressed in various manners. For example, in NR R15, the antenna QCL (quasi co-located) of PDSCH (Physical Downlink Shared Channel) can be used to identify beam information. In some embodiments of the present disclosure, the CSI-RS (Channel State Information-Reference Signal) and SSB (Synchronization Signal Block) resources can also be used to indicate the beams.

A UE 105 can only use one RX beam in a single-UE-panel case or one RX beam per UE panel in a multiple-UE-panel case to receive downlink transmission in a time unit. In some scenarios, there are multiple downlink transmissions to be received for a UE 105, but they can't be received simultaneously by a single RX beam in single UE panel case or can't be received simultaneously by one RX beam per UE panel in multiple UE panel case in one time unit. Then, the UE 105 may only receive one downlink transmission and drop other downlink transmissions, which will cause performance degradation. On the other hand, in some scenarios, there is non-ideal backhaul between multiple TPRs, multiple TRPs 103 cannot schedule a UE 105 with a single PDCCH (Physical Downlink Control Channel) due to large latency. In the case that there is no coordination among the multiple TRPs 103, the multiple TRPs 103 may schedule multiple PDSCHs corresponding to different RX beams in UE side. That may cause a RX beam conflict in the UE side, that is, for a UE 105, there are multiple downlink transmissions to be received which can't be received simultaneously in one time unit. Since "beams" can be expressed in various manners, persons skilled in the art should understand that the RX beam conflict in the UE side can be expressed in various manners. For example, it can be expressed as a spatial reception conflict.

Embodiments of the present disclosure at least provide methods and apparatuses for TRP downlink transmission, which can solve the RX beam conflict in the UE side.

Figure 2:
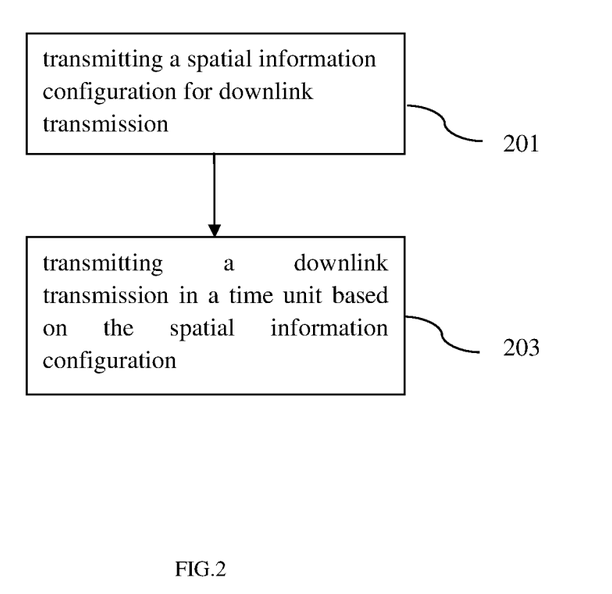
FIG. 2 is a flow diagram illustrating of a method for TRP downlink transmission in accordance with an embodiment of the present disclosure.

FIG. 2 is a flow diagram illustrating a method for TRP downlink transmission in accordance with an embodiment of the present disclosure. The method may be implemented by a TRP 103, for example the first TRP 103a or the second TRP 103b shown in FIG. 1.

As shown in step 201, the method may include transmitting a spatial information configuration for downlink transmission. The spatial information configuration for downlink transmission may also be referred as a spatial information pattern or a spatial information pattern. In some embodiments of the present disclosure, the spatial information configuration can be configured in a high layer by a BS for a UE. For example, the high layer may represent a layer higher than physical (PHY) layer, such as a Radio Resource Control (RRC) layer.

The spatial information configuration may configure at least one time unit for spatial information, i.e., at least one of predefined spatial information and un-predefined spatial information. The predefined spatial information can be fixed, and cannot be overwritten or changed in the configured time units. The un-predefined spatial information is to be indicated in specific spatial information in a downlink control channel or configured by a high layer signaling. That is, the un-predefined spatial information can be flexible, and can be overwritten in the configured time units.

In an embodiment of the present disclosure, the spatial information configuration may include both of the predefined spatial information and the undefined spatial information. In another embodiment of the present disclosure, the spatial information configuration may only include the predefined spatial information. In yet another embodiment of the present disclosure, the spatial information configuration may only include the undefined spatial information.

In some embodiments of the present disclosure, the spatial information configuration may be received from a base station or a TRP 103 having backhaul. Specifically, the TRPs 103 may serve the same UE 105 and all of them under the control of the same base station 101. The base station 101 may transmit the spatial information configuration for the UE 105 to one of the TRPs 103, for example the first TRP 103a in FIG. 1. Other TRPs 103, for example the second TRP 103b can get the spatial information configuration for the UE 105 by backhaul between the base station 101 and TRP 103b or between TRP 103b and TRP 103a.

In some embodiments of the present disclosure, the spatial information configuration may be specific for each UE 105. Thus, for a UE 105 not configured with the spatial information configuration, the TRP 103 does not need to follow the spatial information configuration during the downlink transmission to the UE 105. For example, referring to FIG. 1, TRP 103a may transmit the spatial information configuration configured for the first UE 105a, but not configured for the second UE 105b. In the case that the first TRP 103a transmits the downlink transmission to the first UE 105a, the first TRP 103a needs to follow the spatial information configuration. While in the case that the first TRP 103a transmits the downlink transmission to the second UE 105b, the first TRP 103a does not need to follow the spatial information configuration due to the spatial information configuration being specific for the first UE 105a.

The spatial information, i.e., the predefined spatial information and the un-predefined spatial information can be used to indicate RX beams. In some embodiments of the present disclosure, the spatial information, i.e., the predefined spatial information and the un-predefined spatial information may be associated with at least one of CSI-RS (Channel State Information-Reference Signal) Resources, SSB (Synchronization Signal Block) resources, or SRS (Sounding Reference Signal) resources.

Specifically, for example, the spatial information in each time unit configured in the spatial information configuration can be associated with one or more CSI-RSs. In the case that there is a beam correspondence in the UE side, an SRS resource representing a TX (transmit) beam in uplink can indicate a RX beam in downlink due to a one to one mapping between the TX beam and the RX beam in the UE side. Therefore, the spatial information in each time unit configured in the spatial information configuration can be associated with one or more SRS resources. The undefined spatial information in each time unit configured in the spatial information configuration can be specific spatial information indicated in by PDCCH or configured in a high layer in a TRP 103. Likewise, the specific spatial information is associated with at least one of CSI-RS and SSB resources, or at least one SRS resource indicated by PDCCH or configured in a high layer in a TRP 103.

As shown in FIG. 1, in step 203, the method may include transmitting a downlink transmission in a time unit based on the spatial information configuration. In some embodiments of the present disclosure, in the case that the time unit is configured for the predefined spatial information, the downlink transmission may be transmitted according to the predefined spatial information. In some embodiments of the present disclosure, in the case that the time unit is configured for un-predefined spatial information, the downlink transmission may be transmitted according to the spatial information indicated in the specific spatial information in the downlink control channel or configured by the high layer signaling.

Embodiments of the present disclosure also provide a method for TRP downlink transmission, which may also relate to time allocation for downlink transmission. The method can be separately implemented or combined with the above illustrated methods. For example, embodiments of the present disclosure can configure a time allocation configuration in high layer by a base station 101 to multiple TRPs 103 in the case that a UE 105 can be served by multiple TRPs 103 in the downlink. The time allocation configuration can indicate the subset of time units for each TRP 103 to do the downlink transmission to a UE 105. A plurality of time units may be configured for multiple TRPs 103 considering the UE 105 may receive multiple TX beams from different TRPs 103 simultaneously. This configuration can increase the scheduling flexibility. Thus, even in the case that the UE 105 cannot receive multiple TX beams from different TRPs 103 simultaneously, this configuration may still be configured to the UE 105 in spite of a RX beam conflict in the UE side since it can increase the scheduling flexibility.

For example, considering the case that a UE 105 can receive multiple TX beams from multiple TRPs 103 by using a RX beam or one RX beam per UE panel simultaneously, the subset of time units configured for one TRP, for example the first TRP 103a may overlap with those configured for another TRP, for example the second TRP 103b for the reasons that the TX beams transmitted in the overlapped time units should be received by the UE 105 simultaneously.

According to some embodiments of the present disclosure, based on the time allocation pattern, i.e., time allocation configuration, each TRP 103 can only transmit downlink transmission in the time units allocated for this TRP 103. However, a UE 105 may be also configured by some TRPs 103 in some periodic or semi-persistent downlink transmissions, like the CSI-RS transmission or SPS (Semi-Persistent Scheduling) downlink transmission, which is configured with a periodicity and an offset for the time allocation. To configure a time allocation configuration between TRPs 103 for reducing the RX beam conflicts in the UE side, the time allocation of periodic or semi-persistent downlink transmissions may be reconfigured according to the time allocation configuration. The time allocation configuration may be indicated to the UE 105 by high layer signaling from a base station 101 or a TRP 103. Therefore, the UE 105 may receive the downlink transmission in a time unit according to the time allocation pattern without reconfiguration of the previously configured periodic or semi-persistent transmission so as to save the overhead.

In some embodiments of the present disclosure, the time allocation configuration may be transmitted from the base station 101 or a TRP 103 having backhaul. Specifically, for example, the time allocation configuration may be only transmitted by one of the TRPs 103, which can serve the same UE 105. The other TRPs 103 can get the time allocation configuration by backhaul between the base station 101 and TRPs 103 or between TRPs 103.

In some embodiments of the present disclosure, the time allocation configuration may be specific for a UE 105. For example, for a UE 105 not configured with a time allocation pattern, the TRP 103 does not need to follow the time allocation configuration to transmit the downlink transmission to the UE 105.

Figure 3:
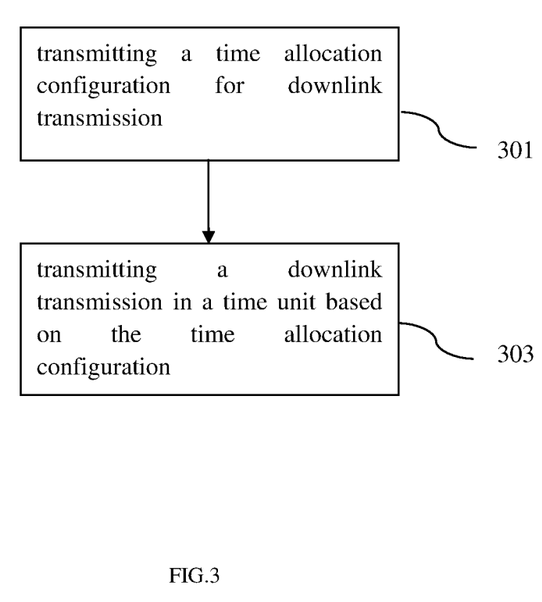
FIG. 3 is a flow diagram illustrating of a method for TRP downlink transmission in accordance with some embodiments of the present disclosure.

FIG. 3 is a flow diagram illustrating a method for TRP downlink transmission in accordance with some embodiments of the present disclosure. The method may be implemented by a TRP 103, for example, the first TRP 103a or the second TRP 103b in FIG. 1.

As shown in FIG. 3, in step 301, the method may include transmitting a time allocation configuration for downlink transmission. The time allocation configuration may configure a subset of time units for each TRP 103. Similar to the spatial information, in some embodiments of the present disclosure, the time allocation configuration may be received from a base station 101 or a TRP 103 having backhaul. The time allocation configuration may be specific for a UE 105.

In step 303, the method may include transmitting a downlink transmission in a time unit based on the time allocation configuration.

In some embodiments of the present disclosure, the method may include transmitting spatial information for the downlink transmission in the time unit so that a UE 105 can receive the downlink transmission in proper RX beams. The spatial information can be configured as illustrated in other embodiments of the present disclosure, for example, the embodiments illustrated in view of FIGS. 1 and 2.

According to an embodiment of the present disclosure, an apparatus can be provided, which can be configured to implementing a method, for example the above method for TRP downlink transmission. In an embodiment of the present disclosure, the apparatus can be a TRP 103, for example, the first TRP 103a or the second TRP 103b shown in FIG. 1.

Figure 4:
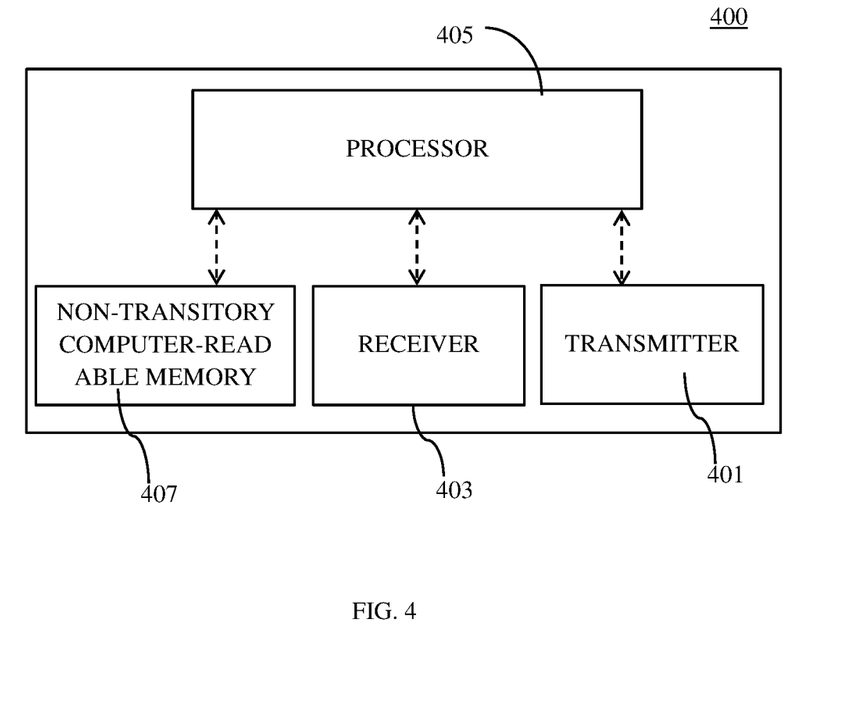
FIG. 4 is a schematic block diagram illustrating an exemplary apparatus according to an embodiment of the present disclosure.

FIG. 4 is a schematic block diagram illustrating an exemplary apparatus 400 according to an embodiment of the present disclosure.

Referring to FIG. 4, the apparatus 400 may include at least one transmitter 401.

In an embodiment of the present disclosure, the at least one transmitter 401 may transmit a spatial information configuration for downlink transmission. The spatial information configuration may configure at least one time unit for at least one of predefined spatial information and un-predefined spatial information, and the un-predefined spatial information is to be indicated in specific spatial information in a downlink control channel or configured by a high layer signaling. The at least one transmitter 401 may transmit a downlink transmission in a time unit based on the spatial information configuration. In the case that the time unit is configured for the predefined spatial information, the downlink transmission is transmitted according to the predefined spatial information. In the case that the time unit is configured for un-predefined spatial information, the downlink transmission is transmitted according to the spatial information indicated in the specific spatial information in the downlink control channel or configured by the high layer signaling.

In another embodiment of the present disclosure, the at least one transmitter 401 may transmit a time allocation configuration for downlink transmission and transmit a downlink transmission in a time unit based on the time allocation configuration. The time allocation configuration may configure a subset of time units for each TRP 103.

In yet another embodiment of the present disclosure, the apparatus 400 may have an antenna (not shown), which transmits and receives radio signals. The apparatus 400 may have at least one receiver 403. The at least one transmitter 401 and at least one receiver 403 can be integrated in at least one transceiver coupled with the antenna. In an embodiment of the present disclosure, the apparatus may also include at least one processor 405 coupled to the at least one transmitter 401 and receiver 403. The apparatus 400 may also include at least one non-transitory computer-readable memory 407, which can store computer executable instructions. The computer executable instructions can be programmed to implement a method with the at least one receiver 403, the at least one transmitter 401 and the at least one processor 405 so that carry out different tasks of a TRP 103 in according to various embodiments of the present disclosure.

Figure 5:
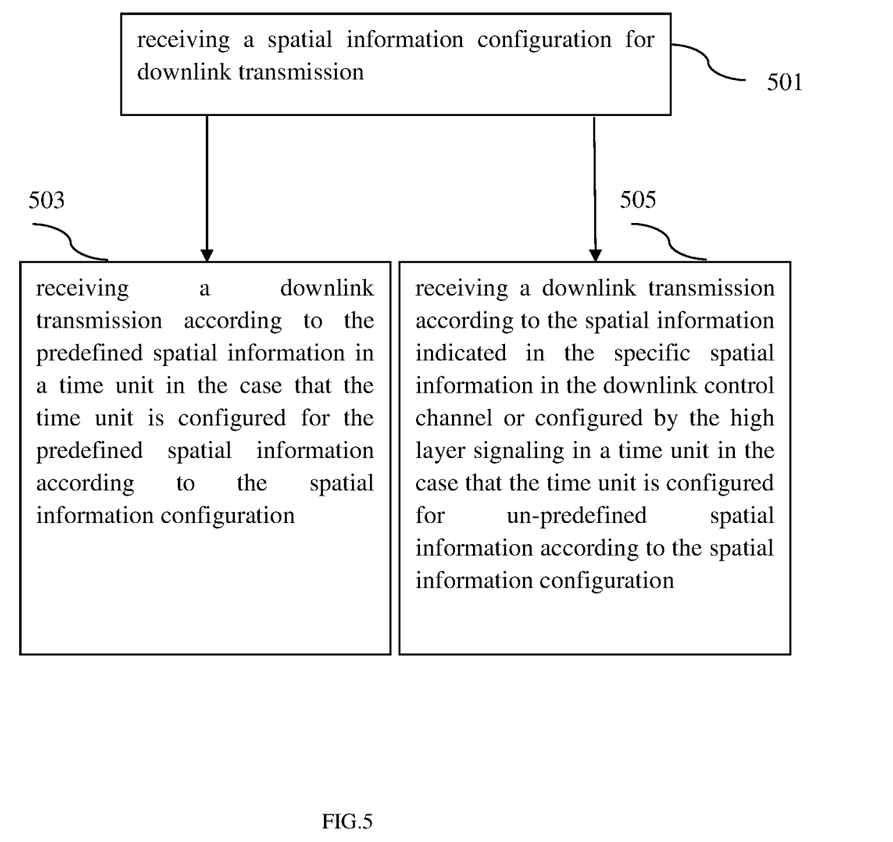
FIG. 5 is a flow diagram illustrating a method for TRP downlink transmission in accordance with some embodiments of the present disclosure.

FIG. 5 is a flow diagram illustrating a method for TRP downlink transmission in accordance with some embodiments of the present disclosure. The method may be implemented by a UE 105 in FIG. 1.

As shown in FIG. 5, in step 501, the method may include receiving a spatial information configuration for downlink transmission, for example receiving from a TRP 103. The spatial information configuration may configure at least one time unit for at least one of predefined spatial information and un-predefined spatial information. The un-predefined spatial information is to be indicated in specific spatial information in a downlink control channel or configured by a high layer signaling.

In step 503, the method may include receiving a downlink transmission according to the predefined spatial information in a time unit in the case that the time unit is configured for the predefined spatial information according to the spatial information configuration.

In step 505, the method may include receiving a downlink transmission according to the spatial information indicated in the specific spatial information in the downlink control channel or configured by the high layer signaling in a time unit in the case that the time unit is configured for un-predefined spatial information according to the spatial information configuration.

Since there is no coordination among multiple TRPs 103, in the case that multiple TRPs 103 configure spatial information in a time unit where un-predefined spatial information is configured for the time unit according to the spatial information configuration, a spatial reception conflict, i.e., RX beam conflict may occur in the UE side. According to an embodiment of the present disclosure, the UE 105 may receive the downlink transmission depending on different solutions for solving the spatial reception conflict.

Specifically, in some embodiments of the present disclosure, the UE 105 may determine the spatial information for the downlink transmission by itself and receive the downlink transmission based on the determined spatial information. In some embodiments of the present disclosure, the spatial information for receiving the downlink transmission may be the last received spatial information for the time unit. The UE 105 may receive the downlink transmission based on the last received spatial information for the time unit. For example, there may be a plurality of spatial information corresponding to multiple RX beams indicated by PDCCH received in different time units. However, the multiple RX beams cannot be received simultaneously in one time unit. The UE 105 can follow the spatial information indicated by the latest received PDCCH. In some embodiments of the present disclosure, the spatial information may be the spatial information indicated by the TRP 103 predefined in the time unit by a high layer signaling. The UE 105 may receive the downlink transmission based on the spatial information indicated by the TRP 103 predefined in this time unit. Furthermore, in some cases of the present disclosure, there are at least two different pieces of spatial information corresponding to multiple RX beams configured in high layer by different TRPs 103 in one time unit, but the multiple RX beams cannot be received simultaneously. The UE 105 can determine to follow which spatial information to receive the downlink transmission in the time unit by itself. In some cases of the present disclosure, there are at least two pieces of different spatial information corresponding to multiple RX beams indicated by different PDCCHs, and they are all received latest in one time unit. However, the multiple RX beams cannot be received simultaneously in one time unit. The UE 105 can determine to follow which spatial information to receive the downlink transmission in the time unit by itself.

Embodiments of the present disclosure also provide a method for TRP downlink transmission, which may also relate to time allocation. The method can be separately implemented or combined with the above illustrated methods, for example, the method illustrated in view of FIG. 5.

Figure 6:
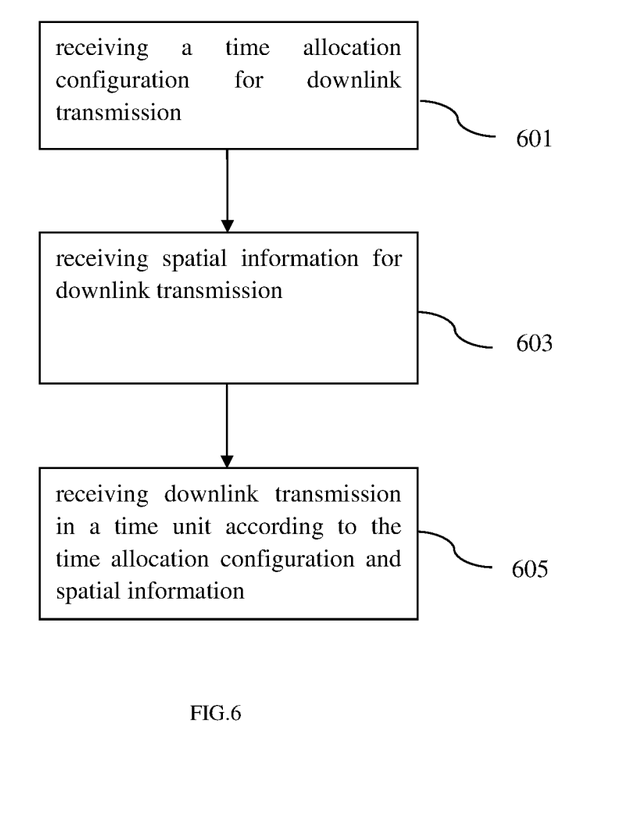
FIG. 6 is a flow diagram illustrating of a method for downlink transmission in accordance with some embodiments of the present disclosure.

FIG. 6 is a flow diagram illustrating a method for downlink transmission in accordance with some embodiments of the present disclosure. The method may be implemented by a UE 105 shown in FIG. 1, for example, the first UE 105a or the second UE 105b in FIG. 1.

As shown in FIG. 6, in step 601, the method may include receiving a time allocation configuration for downlink transmission, for example, from a TRP 103. The time allocation configuration may configure a subset of time units for each TRP 103 to do downlink transmission.

In step 603, the method may include receiving spatial information for downlink transmission.

In step 605, the method may include receiving downlink transmission in a time unit according to the time allocation configuration and spatial information.

According to an embodiment of the present disclosure, an apparatus can be provided, which can be configured to implementing a method, for example the above method for TRP downlink transmission. In an embodiment of the present disclosure, the apparatus can be a UE 105, for example, the first UE 105a or the second UE 105b shown in FIG. 1.

Figure 7:
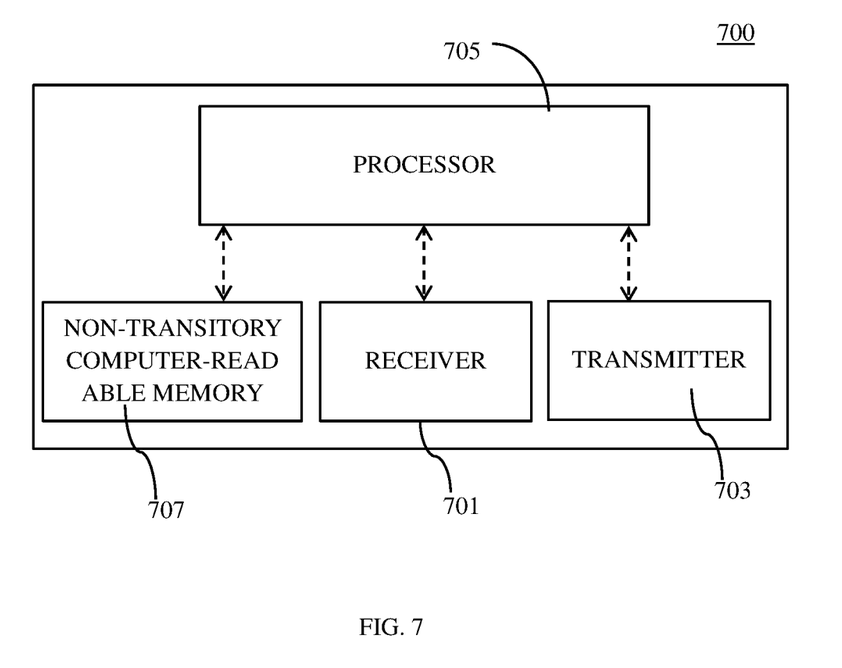
FIG. 7 is a schematic diagram illustrating an exemplary apparatus according to some embodiments of the present disclosure.

FIG. 7 is a schematic diagram illustrating an exemplary apparatus 700 according to some embodiments of the present disclosure.

Referring to FIG. 7, according to an embodiment of the present disclosure, an apparatus 700 may include at least one receiver 701. The at least one receiver 701 may receive a time allocation configuration for downlink transmission. The time allocation configuration configures a subset of time units for each of a plurality of transmit-receive points to do downlink transmission. The at least one receiver 701 may also receive spatial information for downlink transmission, and receive the downlink transmission in a time unit according to the time allocation configuration and spatial information.

In another embodiment of the present disclosure, the at least one receiver 701 may receive a time allocation configuration for downlink transmission and receive a downlink transmission in a time unit based on the time allocation configuration. The time allocation configuration may configure a subset of time units for each TRP 103.

In yet another embodiment of the present disclosure, the apparatus 700 may have an antenna (not shown), which transmits and receives radio signals. The apparatus 700 may have at least one transmitter 703. The at least one receiver 701 and at least one transmitter 703 can be integrated in at least one transceiver coupled with the antenna. In an embodiment of the present disclosure, the apparatus may also include at least one processor 705 coupled to the at least one receiver 701 and transmitter 703. The apparatus 700 may also include at least one non-transitory computer-readable memory 707, which can store computer executable instructions. The computer executable instructions can be programmed to implement a method with the at least one receiver 701, the at least one transmitter 703 and the at least one processor 705 so that carry out different tasks of a UE 105 in according to various embodiments of the present disclosure.

Figure 8:
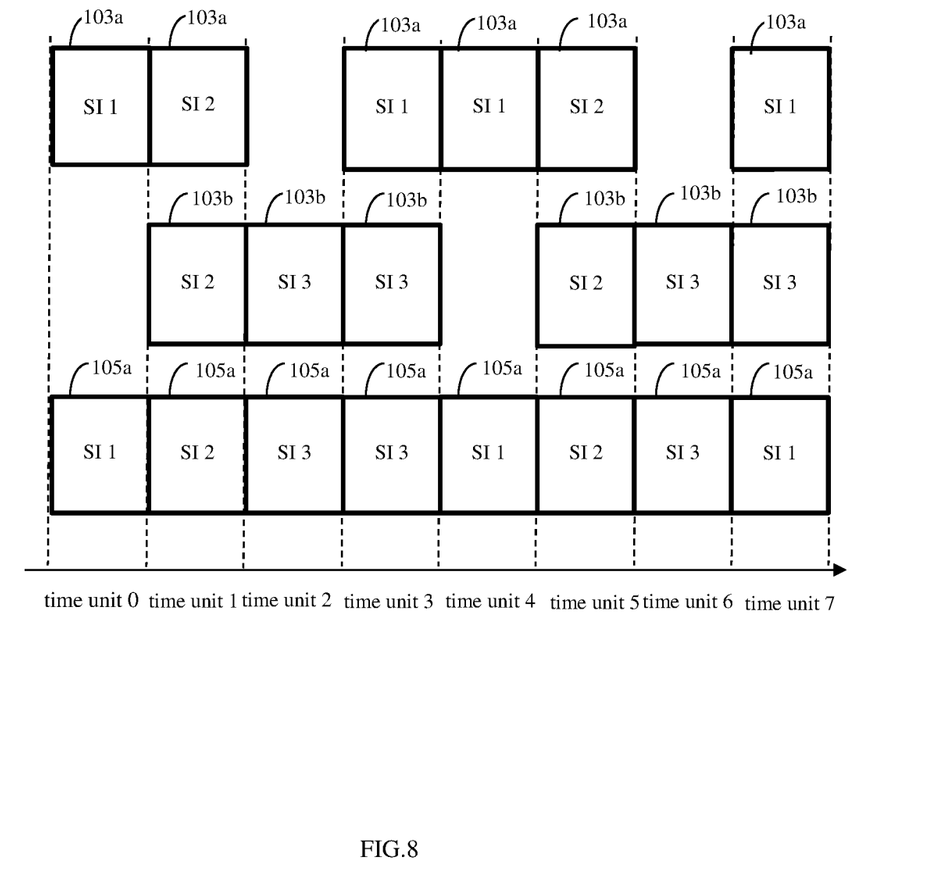
FIG. 8 illustrates an exemplary scenario of implementing a method for TRP downlink transmission according to an embodiment of the present disclosure.

FIG. 8 illustrates an exemplary scenario of implementing a method for TRP downlink transmission according to an embodiment of the present disclosure.

In FIG. 8, assuming two TRPs 103, for example the first TRP 103a and the second TRP 103b shown in FIG. 1 can serve the same UE 105, for example, the first UE 105a shown in FIG. 1. After beam management between the first TRP 103a and the first UE 105a, the base station 101 may configure two TX beams in the first TRP 103a represented by CSI-RS resource 1 and CSI-RS resource 2 to be used to transmit downlink transmissions to the first UE 105a. After beam management between the second TRP 103b and the first UE 105a, the base station 101 may configure two TX beams in the second TRP 103b represented by CSI-RS resource 3 and CSI-RS resource 4 to be used to transmit downlink transmissions to the first UE 105a. Through a group based beam reporting, CSI-RS resource 2 and CSI-RS resource 3 can be received simultaneously by the first UE 105a. Therefore, a spatial information configuration can be configured for the first UE 105a by the base station 101 as follows:

spatial information 1 (SI 1), which is associated with CSI-RS resource 1 with periodicity 4 time units and offset 0 time unit, which means the time unit index n applying spatial information 1 should satisfy the equation (n mod 4=0)

spatial information 2 (SI 2), which is associated with both CSI-RS resource 2 and CSI-RS resource 3 with periodicity 4 time units and offset 1 time unit, which means the time unit index n applying spatial information 2 should satisfy the equation (n mod 4=1).

spatial information 3 (SI 3), which is associated with CSI-RS resource 4 with periodicity 4 time units and offset 2 time unit, which means the time unit index n applying the spatial information 3 should satisfy the equation (n mod 4=2); and spatial information 4, which is undefined spatial information with periodicity 4 time units and offset 3 time unit, which means the time unit index n applying the spatial information 4 should satisfy the equation (n mod 4=3).

Table 1 can be used to present the mapping between the time unit n and the spatial information according to the configured spatial information configuration described above.

TABLE 1

| n mod 4 = 0 | n mod 4 = 1 | n mod 4 = 2 | n mod 4 = 3 |
| --- | --- | --- | --- |
| spatial information 1 (CSI-RS resource 1) | spatial information 2 (CSI-RS resource 2, CSI-RS resource 3) | spatial information 3 (CSI-RS resource 4) | spatial information 4 (undefined) |

The spatial information configuration can be transmitted to the first UE 105*a* by one of the two TRP 103, for example, the first TRP 103*a*. The second TRP 103*b* can also get the configuration by the backhaul between the base station 101 and the second TRP 103*b* in this example.

The first TRP 103*a* and the second TRP 103*b* will follow the spatial information configuration to transmit a downlink transmission to the first UE 105*a*. The UE 105 will follow the received spatial information configuration to receive the downlink transmissions from the first TRP 103*a* or the second TRP 103*b*.

In time unit 0, according to the spatial information configuration, the spatial information for time unit 0 is spatial information 1 associated with CSI-RS resource 1. Then only the first TRP 103*a* can transmit a downlink transmission to the first UE 105*a* by using the TX beam represented by CSI-RS resource 1. At the same time, the first UE 105*a* can use the RX beam corresponding to the spatial information 1 to receive the downlink transmission according to the spatial information configuration.

In the time unit 1, the configured spatial information is spatial information 2 associated with both CSI-RS resource 2 and CSI-RS resource 3 according to the spatial information configuration. The first TRP 103*a* can transmit a downlink transmission to the first UE 105*a* by using the TX beam represented by CSI-RS resource 2, and the second TRP 103*b* can transmit a downlink transmission to the first UE 105*a* by using the TX beam represented by CSI-RS resource 3. At the same time, the first UE 105*a* can use the RX beam corresponding to the spatial information 2 where the RX beam can receive the TX beams represented by CSI-RS resource 2 and CSI-RS resource 3 simultaneously to receive the downlink transmissions from the first TRP 103*a* and the second TRP 103*b*.

In the time unit 2, the configured spatial information is spatial information 3 associated with CSI-RS resource 4 according to the spatial information configuration. The second TRP 103*b* can transmit a downlink transmission to the first UE 105*a* by using the TX beam represented by CSI-RS resource 4. At the same time, the first UE 105*a* can use the RX beam corresponding to the spatial information 3 to receive the downlink transmission according to the spatial information configuration.

In the time unit 3, the configured spatial information is spatial information 4, which is undefined spatial information according to the spatial information configuration. Both the first TRP 103*a* and the second TRP 103*b* can use this time unit to transmit a downlink transmission to the first UE 105*a* by indicating specific spatial information to the first UE 105*a*.

Specifically, in this example in FIG. 8, assuming that the first TRP 103*a* transmits a PDCCH in time unit 1 to schedule a downlink transmission in time unit 3 to the first UE 105*a* and spatial information 1 associated with CSI-RS resource 1 is indicated in the PDCCH for the downlink transmission in time unit 3. At the same time, assuming that the second TRP 103*b* transmits a PDCCH in time unit 2 to schedule a downlink transmission in time unit 3 to the first UE 105*a* and spatial information 3 associated with CSI-RS resource 3 is indicated in the PDCCH for the downlink transmission in time unit 3. Therefore, there is a RX beam conflict in the UE side according to the spatial information indicated in the PDCCHs transmitted from the first TRP 103*a* and the second TRP 103*b*.

The first UE 105*a* may receive the downlink transmission from the first TRP 103*a* or the second TRP 103*b* depending on different solutions for solving the spatial reception conflict. For example, the first UE 105*a* may receive the downlink transmission based on the spatial information determined by itself, receive the downlink transmission based on the last received spatial information for the time unit, or receive the downlink transmission based on the spatial information indicated by the TRP 103 predefined in the time unit by a high layer signaling. Specifically, in the case that the first UE 105*a* chooses to receive the downlink transmission based on the last received spatial information for the time unit, since spatial information 3 from the second TRP is received later than spatial information 1 from the first TRP 103*a*, the first UE 105*a* will follow spatial information 3 to receive the downlink transmission by using the RX beam corresponding to CSI-RS resource 3.

Since the periodicity is 4 time units, the time units starting from 4 to 7 will repeat the operation of time unit 0 to 3 respectively, and so on. That is, a new cycle will repeat in the periodicity of 4 time units. Specifically, the first UE 105*a* will receive the download link transmission in time unit 4 in a manner similar to the case of time unit 0. The first UE 105*a* will receive the downlink transmission in time unit 5 in a manner similar to the case of time unit 1. The first UE 105*a* will receive the download link transmission in time unit 6 in a manner similar to the case of time unit 2. The first UE 105*a* will receive the download link transmission in time unit 7 in a manner similar to the case of time unit 3.

Figure 9:
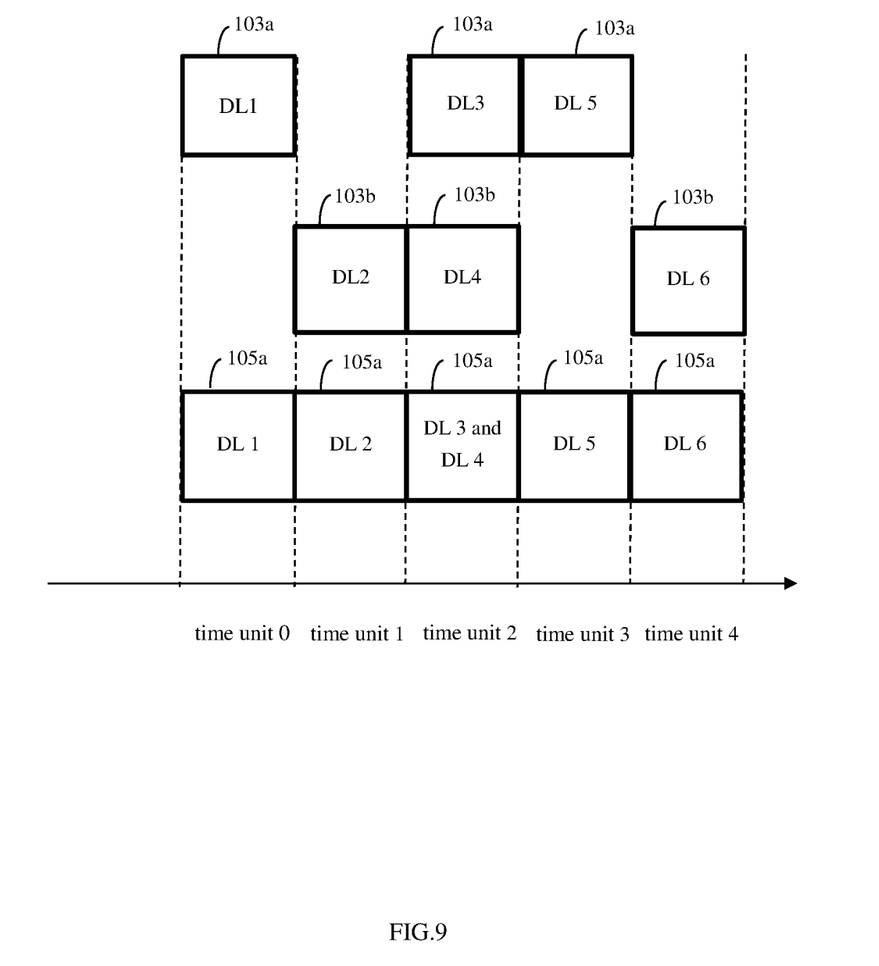
FIG. 9 illustrates another exemplary scenario of implementing a method for downlink transmission according to an embodiment of the present disclosure.

FIG. 9 illustrates another exemplary scenario of implementing a method for downlink transmission according to an embodiment of the present disclosure.

In FIG. 9, assuming the two TRPs 103, for example, the first TRP 103*a* and the second TRP 103*b* can serve the first UE 105*a* in downlink transmission. After beam management between the first TRP 103*a* and the first UE 105*a*, the base station 101 can configure two TX beams in the first TRP 103a represented by CSI-RS resource 1 and CSI-RS resource 2 to be used to transmit the downlink transmission to the first UE 105a. After beam management between the second TRP 103b and the first UE 105a, the base station 101 can configure two TX beams in the second TRP 103b represented by CSI-RS resource 3 and CSI-RS resource 4 to be used to transmit the downlink transmission to the first UE 105a. Through a group based beam reporting, CSI-RS resource 1 and CSI-RS resource 4 can be received simultaneously by the first UE 105a. Meanwhile, the downlink time allocation configuration can be configured for the first UE 105a by the base station 101 as in table 2:

TABLE 2

| n mod 5 = 0 | nmod 5 = 1 | nmod 5 = 2 | nmod 5 = 3 | nmod 5 = 4 |
|---|---|---|---|---|
| TRP 103a | TRP 103b | TRP 103a and the second TRP 103b | TRP 103a | TRP 103b |

The downlink time allocation pattern can be transmitted to the first UE 105a by one TRP 103, for example the second TRP 103b. The first TRP 103a can also get the configuration by the backhaul between BS 10 and the first TRP 103a in this example.

Specifically, according to the time allocation configuration, the first TRP 103a can do the downlink transmission to the first UE 105a with either TX beam associated with CSI-RS resource 1 or TX beam associated with CSI-RS resource 2 in the case that time unit n satisfies the equation (n mod 5=0 or 3). The second TRP 103b can do the downlink transmission to the first UE 105a with either TX beam associated with CSI-RS resource 3 or TX beam associate with CSI-RS resource 4, in the case that time unit n satisfies the equation (n mod 5=1 or 4). In the case that time unit n satisfies with the equation (n mod 5=2), both two TPRs 103 can do the downlink transmission to the first UE 105a. Wherein, the first TRP 103a can use the TX beam associated with CSI-RS resource 1 and CSI-RS resource 2, while the second TRP 103b can use the TX beam associated with CSI-RS resource 3 and CSI-RS resource 4 in the time unit. TX beam associated with CSI-RS resource 1 and CSI-RS resource 4 can be received simultaneously. In order to avoid the RX beam conflict, the first TRP 103a can use the TX beam associated with CSI-RS resource 1, while the second TRP 103b can use the TX beam associated with CSI-RS resource 4 in the time unit.

In the UE side, the first UE 105a can receive the downlink transmission in the case time unit n satisfies with (n mod 5=0 or 3), wherein the TX beam is associated with CSI-RS resource 1 or CSI-RS resource 2 since only the first TRP 103a can do the DL transmission for the UE according to the time allocation configuration. For the other downlink transmission, wherein the TX beam is not associated with CSI-RS resource 1 or CSI-RS resource 2, doesn't need to be received by the first UE 105a according to the time allocation configuration in the case that time unit n satisfies with (n mod 5=0 or 3).

Similarly, the first UE 105a can receive the downlink transmission in the case that time unit n satisfies with (n mod 5=1 or 4). Wherein the TX beam is associated with CSI-RS resource 3 or CSI-RS resource 4, since only the second TRP 103b can do the DL transmission to the UE according to the DL time allocation pattern. The other downlink transmission, wherein the TX beam is not associated with CSI-RS resource 3 or CSI-RS resource 4, don't need to be received by the first UE 105a according to the DL time allocation pattern in the case that time unit n satisfies with (n mod 5=0 or 3).

In the case that time unit n satisfies with (n mod 5=2), the first UE 105a can receive the downlink transmission with the RX beam which can receive the TX beam associated with CSI-RS resource 1 or CSI-RS resource 2 in TRP 103a or TX beam associated with CSI-RS resource 3 or CSI-RS resource 4 according to the DL time allocation pattern. In this example, TX beam associated with CSI-RS resource 1 and TX beam associated with CSI-RS resource 4 can be received simultaneously. TRP 103a and TRP 103b can use the two TX beams associated with CSI-RS resource 1 and CSI-RS resource 4 respectively to do downlink transmission to the UE 105a to avoid a RX beam conflict. The first UE 105a does not need to receive the downlink transmission in the case that the corresponding the TX beam associated with CSI-RS resource 1 or CSI-RS resource 2 in TRP 103a or TX beam associated with CSI-RS resource 3 or CSI-RS resource 4.

More specifically, in time unit 0 and time unit 3, the first TRP 103a can transmit downlink transmissions, i.e., DL 1 and DL 5 to the first UE 105a per time unit with the TX beam associated with CSI-RS resource 2 and the TX beam associated with CSI-RS resource 1 respectively according to the configured DL time allocation configuration. At the same time, the first UE 105a can receive the downlink transmission, i.e., DL 1 and DL 5 with RX beam corresponding to the TX beam associated with CSI-RS resource 2 and the TX beam associated with CSI-RS resource 1 respectively in time unit 0 and time unit 3.

In the case that there is a periodic CSI-RS resource 4 in time unit 3 according to a transmission configuration of the periodic CSI-RS resource 4, the first UE 105a does not need to receive the CSI-RS resource 4 in time unit 3. CSI-RS resource 4 can only be transmitted by the second TRP 103b. However, only TRP 103a can do the downlink transmission in time unit 3 according to the time allocation configuration. Accordingly, the second TRP 103b cannot transmit CSI-RS resource 4, In time unit 1 and time unit 4, the second TRP 103b can transmit downlink transmissions, i.e., DL 2 and DL 6 to the first UE 105a per time unit with the TX beam associated with CSI-RS resource 3 and the TX beam associated with CSI-RS resource 4 respectively according to the configured DL time allocation pattern. At the same time, the first UE 105a can receive the downlink transmission, i.e., DL 2 and DL 6 with RX beam corresponding to the TX beam associated with CSI-RS resource 3 and the TX beam associated with CSI-RS resource 4 respectively in time unit 1 and time unit 4.

In time unit 2, the first TRP 103a can transmit a downlink transmission, DL 3 to the first UE 105a with the TX beam associated with CSI-RS resource 1 and the second TRP 103b transmits a downlink transmission, DL 4 to the first UE 105a with the TX beam associated with CSI-RS resource 4 according to the DL time allocation pattern. At the same time, the first UE 105a can receive the downlink transmissions, ie., DL 3 and DL 4 with RX beam corresponding to the TX beam associated with CSI-RS resource 1 and TX beam associated with CSI-RS resource 4.

In the case that there is a periodic CSI-RS resource 1 in time unit 4 according to the transmission configuration of the periodic CSI-RS resource 1, the first UE 105a does not need to receive the CSI-RS resource 1 in this time unit. The first TRP 103a cannot transmit the CSI-RS resource 1 in this time unit. Only the TX beam associated with CSI-RS resource 3 and CSI-RS resource 4 in the second TRP 103b can be transmitted in this time unit according to the time allocation pattern.

In the above example, there is no RX beam conflict in the UE side. However, for example, the first TRP 103a may transmit a PDCCH in time unit 0 to schedule a downlink transmission in time unit 2 to the first UE 105a. Spatial information 2 associated with CSI-RS resource 2 is indicated in the PDCCH for the downlink transmission in time unit 2. At the same time, the second TRP 103b may transmit a PDCCH in time unit 1 to schedule a downlink transmission in time unit 2 to the first UE 105a. Spatial information 4 associated with CSI-RS resource 4 is indicated in the PDCCH for the downlink transmission in time unit 2. Then, there is a RX beam conflict in the UE side according to the spatial information indicated in the PDCCHs transmitted from the first TRP 103a and the second TRP 103b. The first UE 105a may use one of the solutions illustrated above to solve the RX beam conflict.

For example, the first UE 105a may receive the downlink transmission based on the latest received spatial information. Since spatial information 4 indicated in PDCCH from the second TRP 103b is received later than the spatial information 2 indicated in PDCCH from the first TRP 103a, the first UE 105a may follow the spatial information 4 to receive the downlink transmission by using the RX beam corresponding to the CSI-RS resource 4.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "including," "having," and the like, as used herein, are defined as "including."

What is claimed is:

1. A user equipment (UE), comprising:
   at least one memory; and
   at least one processor coupled with the at least one memory and configured to cause the UE to:
     receive a spatial information configuration for downlink transmission, wherein the spatial information configuration configures at least one time unit for at least one of predefined spatial information and un-predefined spatial information, and the un-predefined spatial information is to be indicated in specific spatial information in a downlink control channel or configured by a high layer signaling, wherein the predefined spatial information that is received is not able to be overwritten in the at least one time unit, and the un-predefined spatial information that is received is able to be overwritten in the at least one time unit;
     receive a downlink transmission according to the predefined spatial information in a time unit of the at least one time unit in response to the time unit being configured for the predefined spatial information according to the spatial information configuration; and
     receive a downlink transmission according to the spatial information indicated in the specific spatial information in the downlink control channel or configured by the high layer signaling in the time unit in response to the time unit being configured for un-predefined spatial information according to the spatial information configuration.

2. The UE of claim 1, wherein, in response to the time unit being configured for un-predefined spatial information and there is a spatial reception conflict, the spatial information for receiving the downlink transmission is selected by the UE.

3. The UE of claim 1, wherein, in response to the time unit being configured for un-predefined spatial information and there is a spatial reception conflict, the spatial information for receiving the downlink transmission is the last received spatial information for the time unit.

4. The UE of claim 1, wherein, in response to the time unit being configured for un-predefined spatial information and there is a spatial reception conflict, the spatial information for receiving the downlink transmission is the spatial information indicated by a transmit-receive point predefined in the time unit by a high layer signaling.

5. The UE of claim 1, wherein the predefined spatial information and the un-predefined spatial information indicated in the specific spatial information is associated with at least one of channel state information reference signal resources, synchronization signal block resources, or sounding reference signal resources.

6. A method performed by a base station, the method comprising:
   transmitting a spatial information configuration for downlink transmission, wherein the spatial information configuration configures at least one time unit for at least one of predefined spatial information and un-predefined spatial information, and the un-predefined spatial information is to be indicated in specific spatial information in a downlink control channel or configured by a high layer signaling, wherein the predefined spatial information that is transmitted is not able to be overwritten in the at least one time unit, and the un-predefined spatial information that is transmitted is able to be overwritten in the at least one time unit; and transmitting a downlink transmission in a time unit of the at least one time unit based on the spatial information configuration, wherein:

in response to the time unit being configured for the predefined spatial information, the downlink transmission is transmitted according to the predefined spatial information; and in response to the time unit being configured for un-predefined spatial information, the downlink transmission is transmitted according to the spatial information indicated in the specific spatial information in the downlink control channel or configured by the high layer signaling.

7. The method of claim 6, wherein the spatial information configuration is transmitted to a user equipment (UE).

8. The method of claim 6, wherein the predefined spatial information and the un-predefined spatial information indicated in the specific spatial information is associated with at least one of channel state information reference signal resources, synchronization signal block resources, or sounding reference signal resources.

9. A method performed by a user equipment (UE), the method comprising:

receiving a spatial information configuration for downlink transmission, wherein the spatial information configuration configures at least one time unit for at least one of predefined spatial information and un-predefined spatial information, and the un-predefined spatial information is to be indicated in specific spatial information in a downlink control channel or configured by a high layer signaling, wherein the predefined spatial information that is received is not able to be overwritten in the at least one time unit, and the un-predefined spatial information that is received is able to be overwritten in the at least one time unit;

receiving a downlink transmission according to predefined spatial information in a time unit of the at least one time unit in response to the time unit being configured for the predefined spatial information according to the spatial information configuration; and receiving a downlink transmission according to the spatial information indicated in the specific spatial information in the downlink control channel or configured by the high layer signaling in the time unit in response to the time unit being configured for un-predefined spatial information according to the spatial information configuration.

10. The method of claim 9, wherein, in response to the time unit being configured for un-predefined spatial information and there is a spatial reception conflict, the spatial information for receiving the downlink transmission is selected by the UE.

11. The method of claim 9, wherein, in response to the time unit being configured for un-predefined spatial information and there is a spatial reception conflict, the spatial information for receiving the downlink transmission is the last received spatial information for the time unit.

12. The method of claim 9, wherein, in response to the time unit being configured for un-predefined spatial information and there is a spatial reception conflict, the spatial information for receiving the downlink transmission is the spatial information indicated by a transmit-receive point predefined in the time unit by high layer signaling.

13. The method of claim 9, wherein the predefined spatial information and the un-predefined spatial information is indicated in the specific spatial information associated with at least one of channel state information reference signal resources, synchronization signal block resources, or sounding reference signal resources.

14. A base station, comprising:

at least one memory; and at least one processor coupled with the at least one memory and configured to cause the base station to:

transmit a spatial information configuration for downlink transmission, wherein the spatial information configuration configures at least one time unit for at least one of predefined spatial information and un-predefined spatial information, and the un-predefined spatial information is to be indicated in specific spatial information in a downlink control channel or configured by a high layer signaling, wherein the predefined spatial information that is transmitted is not able to be overwritten in the at least one time unit, and the un-predefined spatial information that is transmitted is able to be overwritten in the at least one time unit; and transmit a downlink transmission in a time unit of the at least one time unit based on the spatial information configuration, wherein:

in response to the time unit being configured for the predefined spatial information, the downlink transmission is transmitted according to the predefined spatial information; and in response to the time unit being configured for un-predefined spatial information, the downlink transmission is transmitted according to the spatial information indicated in the specific spatial information in the downlink control channel or configured by the high layer signaling.

15. The base station of claim 14, wherein the spatial information configuration is transmitted to a user equipment (UE).

16. The base station of claim 14, wherein the predefined spatial information and the un-predefined spatial information indicated in the specific spatial information is associated with at least one of channel state information reference signal resources, synchronization signal block resources, or sounding reference signal resources.

* * * * *